US010709913B2

(12) United States Patent
Dyer et al.

(10) Patent No.: US 10,709,913 B2
(45) Date of Patent: Jul. 14, 2020

(54) FALL RESTRAINT SYSTEM

(71) Applicant: Auburn University, Auburn, AL (US)

(72) Inventors: David Dyer, Auburn, AL (US); Tyler Sherer, Auburn, AL (US); David Carrell, Baton Rouge, LA (US); Jim Flaniken, Marlboro, MA (US); Chris Gaddes, Birmingham, AL (US)

(73) Assignee: Auburn University, Auburn, AL (US)

( * ) Notice: Subject to any disclaimer, the term of this patent is extended or adjusted under 35 U.S.C. 154(b) by 0 days.

(21) Appl. No.: 16/744,923

(22) Filed: Jan. 16, 2020

(65) Prior Publication Data
US 2020/0147420 A1    May 14, 2020

Related U.S. Application Data

(63) Continuation of application No. 16/179,345, filed on Nov. 2, 2018, now Pat. No. 10,537,757, which is a
(Continued)

(51) Int. Cl.
*A62B 35/00* (2006.01)
*F16H 35/18* (2006.01)
*E04G 21/32* (2006.01)

(52) U.S. Cl.
CPC .......... *A62B 35/0068* (2013.01); *A62B 35/00* (2013.01); *A62B 35/0043* (2013.01);
(Continued)

(58) Field of Classification Search
CPC ............ A62B 35/0068; A62B 35/0043; A62B 35/005; A62B 35/0056; A62B 35/0062;
A62B 35/00; E04G 21/3204; E04G 21/3214; E04G 21/3233; E04G 21/3238; E04G 21/3242; E04G 21/3276;
(Continued)

(56) References Cited

U.S. PATENT DOCUMENTS 2,232,163 A * 2/1941 Brecht ................... A62B 35/00
119/770
3,061,833 A * 11/1962 De Caro ................. B25C 1/105
227/10
(Continued)

FOREIGN PATENT DOCUMENTS

| CA | 2694393 | | 8/2011 | |
|----|---------|--|--------|--|
| EP | 1956163 | | 8/2008 | |
| EP | 1956163 | A2 * | 8/2008 | ......... A62B 35/0068 |

*Primary Examiner* — Eret C McNichols
(74) *Attorney, Agent, or Firm* — Christopher M. Scherer; DeWitt LLP

(57) ABSTRACT

The present system for fall restraint includes a mounting frame connected to a trigger mechanism and firing blocks, with a trigger cable extending through apertures in the mounting frame and trigger mechanism. Sudden movement by a user, such as a fall, actuates the trigger mechanism to trigger the firing blocks. The firing blocks are loaded with anchors and firing cartridges. Triggering the firing blocks causes the cartridges to fire, propelling the anchors into an anchoring surface, such as a roof. Because the user is connected to the trigger cable, once the anchors deploy the user is anchored to the roof and their fall arrested.

20 Claims, 7 Drawing Sheets

Related U.S. Application Data continuation of application No. 15/583,549, filed on May 1, 2017, now Pat. No. 10,118,057.

(60) Provisional application No. 62/329,536, filed on Apr. 29, 2016, provisional application No. 62/355,616, filed on Jun. 28, 2016, provisional application No. 62/370,143, filed on Aug. 2, 2016.

(52) U.S. Cl.
CPC ..... *E04G 21/3204* (2013.01); *E04G 21/3276* (2013.01); *F16H 35/18* (2013.01); *A62B 35/005* (2013.01); *A62B 35/0056* (2013.01); *A62B 35/0062* (2013.01); *E04G 21/328* (2013.01); *E04G 21/3214* (2013.01); *E04G 21/3233* (2013.01); *E04G 21/3238* (2013.01); *E04G 21/3242* (2013.01)

(58) Field of Classification Search
CPC ....... E04G 21/328; B25C 1/085; B25C 1/123; B25C 1/143; B25C 1/163
See application file for complete search history.

(56) References Cited

U.S. PATENT DOCUMENTS

| | | | |
|---|---|---|---|
| 3,129,429 A * | 4/1964 | Hilti | B25C 1/146 227/10 |
| 3,398,684 A * | 8/1968 | Kvavle | F42B 15/00 102/374 |
| 3,556,378 A * | 1/1971 | Wolfgang Bayer | B25C 1/105 227/9 |
| 3,653,139 A * | 4/1972 | Temple | B25C 1/123 42/106 |
| 4,249,713 A | 2/1981 | Glynn et al. | |
| 4,607,724 A | 8/1986 | Hillberg | |
| 4,697,523 A * | 10/1987 | Saxby | F42B 6/10 102/440 |
| 4,705,200 A * | 11/1987 | Kopf | B25C 1/123 227/8 |
| 4,852,692 A * | 8/1989 | Flaherty | A62B 35/04 340/573.1 |
| 4,890,778 A * | 1/1990 | Hawkins | B25C 1/105 227/10 |
| 5,036,949 A | 8/1991 | Crocker et al. | |
| 5,054,576 A | 10/1991 | Glynn | |
| 5,287,944 A | 2/1994 | Woodyard | |
| 5,524,808 A * | 6/1996 | Vogrig | F16B 5/04 227/147 |
| 5,699,875 A * | 12/1997 | Dugan | A62B 35/0068 182/3 |
| 6,227,553 B1 * | 5/2001 | Palmer | A62B 35/0068 280/47.18 |
| 6,779,316 B2 | 8/2004 | Carroll | |
| 7,007,772 B2 | 3/2006 | Argoud | |
| 7,014,088 B2 * | 3/2006 | Brown | B25C 1/02 227/109 |
| 7,537,085 B2 | 5/2009 | Vetesnik | |
| 8,505,797 B1 | 8/2013 | Ringwood et al. | |
| 8,985,273 B2 * | 3/2015 | Terry | A47L 3/02 182/150 |
| 9,248,323 B1 * | 2/2016 | Larsen | A62B 35/0043 |
| 9,675,824 B2 * | 6/2017 | MacKarvich | A62B 35/0068 |
| 10,226,650 B2 * | 3/2019 | Schroeder | A62B 35/0068 |
| 2004/0055818 A1 | 3/2004 | Fulton | |
| 2004/0074695 A1 | 4/2004 | Henry | |
| 2004/0256176 A1 | 12/2004 | Argoud | |
| 2005/0081419 A1 | 4/2005 | Fleischhauer | |
| 2006/0054386 A1 | 3/2006 | Blackford et al. | |
| 2006/0107605 A1 | 5/2006 | Krahn | |
| 2006/0225953 A1 | 10/2006 | Jeun | |
| 2006/0289233 A1 | 12/2006 | Flaherty | |
| 2007/0272811 A1 | 11/2007 | Baake | |
| 2007/0289811 A1 | 12/2007 | Smith | |
| 2008/0277557 A1 | 11/2008 | Vetesnik | |
| 2009/0321184 A1 | 12/2009 | Hamilton | |
| 2010/0012425 A1 | 1/2010 | Gassner | |
| 2011/0186382 A1 | 8/2011 | Sudale et al. | |
| 2011/0186388 A1 | 8/2011 | Sudale et al. | |
| 2011/0198383 A1 | 8/2011 | Masas | |
| 2011/0303484 A1 | 12/2011 | Stoffels | |
| 2011/0314763 A1 | 12/2011 | Gandellini | |
| 2012/0000960 A1 | 1/2012 | Masas | |
| 2013/0228394 A1 | 9/2013 | Sousa et al. | |
| 2013/0264442 A1 | 10/2013 | Correia | |
| 2014/0027583 A1 | 1/2014 | Vogel | |
| 2014/0041960 A1 | 2/2014 | Jones | |
| 2014/0346312 A1 | 11/2014 | Small | |
| 2015/0014092 A1 | 1/2015 | Blaise | |
| 2015/0104279 A1 * | 4/2015 | Kenton | B66F 9/06 414/460 |
| 2015/0129356 A1 | 5/2015 | Strawder | |
| 2016/0096260 A1 | 4/2016 | Pink | |
| 2016/0194890 A1 | 7/2016 | Landry | |
| 2016/0326757 A1 | 11/2016 | West | |
| 2016/0332011 A1 | 11/2016 | MacKarvich | |
| 2017/0232280 A1 | 8/2017 | Carroccia | |
| 2017/0259090 A1 * | 9/2017 | Gaines | A62B 35/0068 |
| 2017/0297188 A1 | 10/2017 | Huang | |

\* cited by examiner

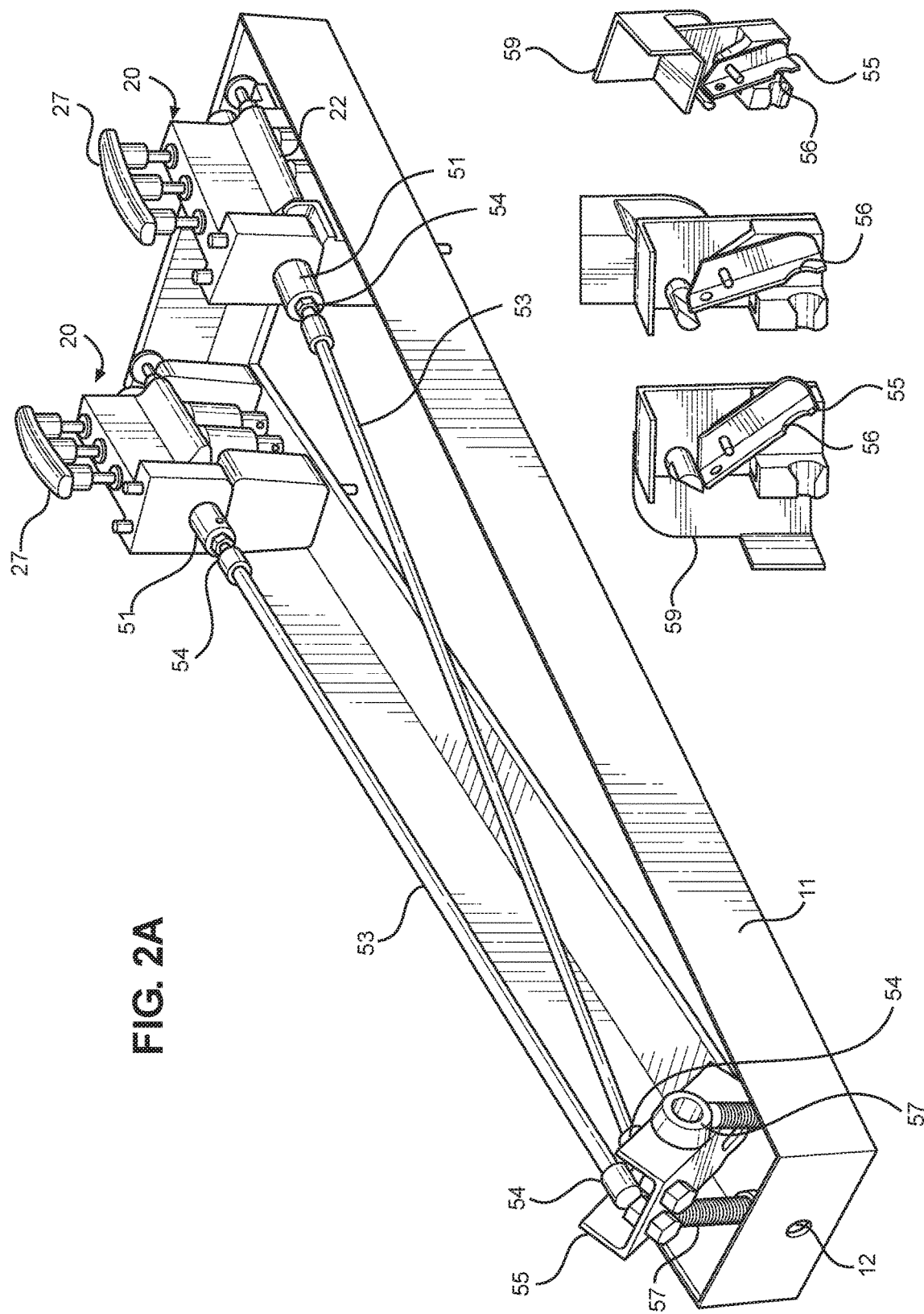

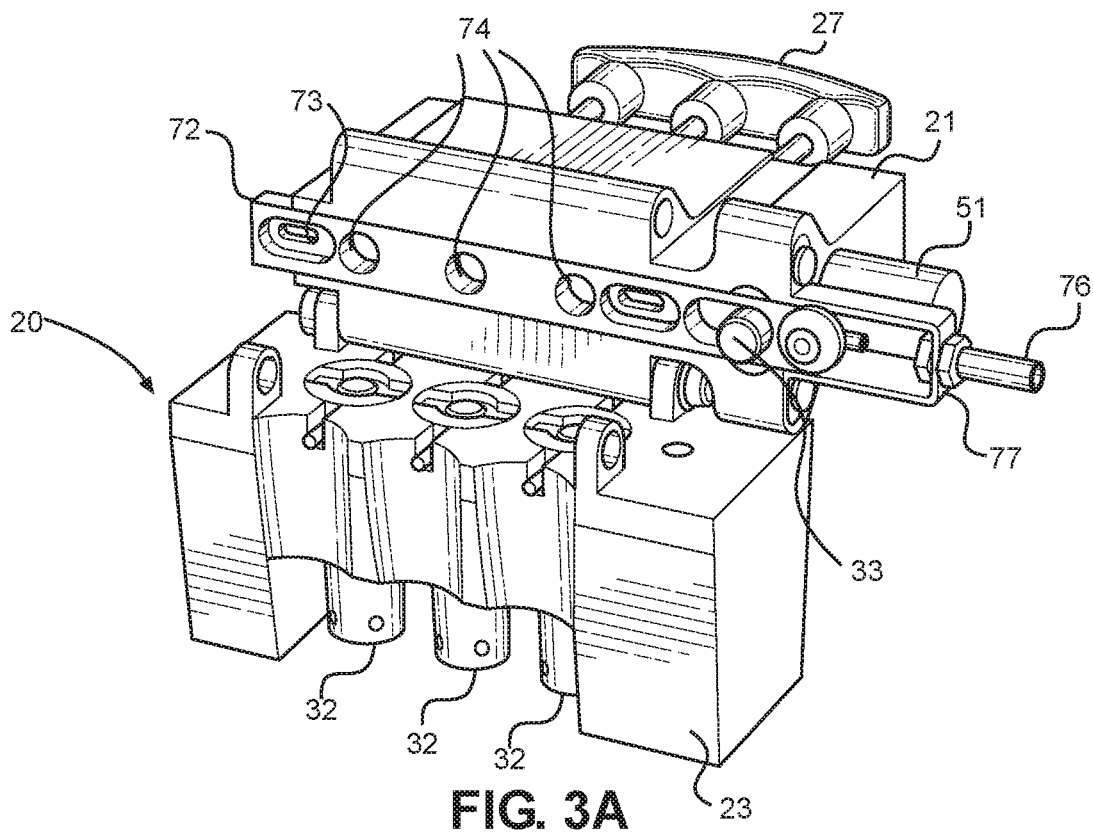
FIG. 3A
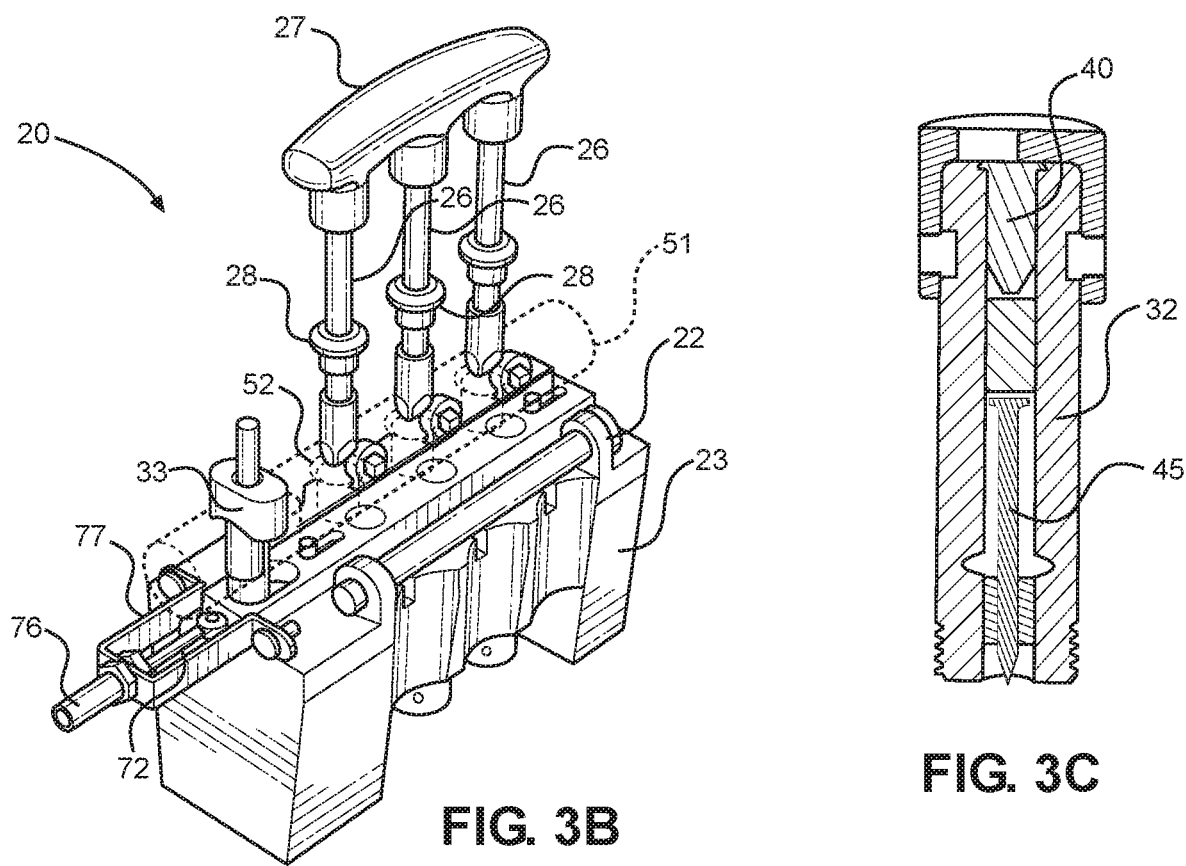
FIG. 3B
FIG. 3C

FALL RESTRAINT SYSTEM

CROSS-REFERENCE TO RELATED APPLICATIONS

The present application is a continuation of U.S. patent application Ser. No. 16/179,345, filed on Nov. 2, 2018, which application is a continuation of U.S. patent application Ser. No. 15/583,549, filed on May 1, 2017, which application claims priority of U.S. Provisional Patent Application No. 62/329,536, filed on Apr. 29, 2016, the contents of which are incorporated herein by reference in their entirety. The present application claims priority of U.S. Provisional Patent Application No. 62/355,616, filed on Jun. 28, 2016, the contents of which are incorporated herein by reference in their entirety. The present application claims priority of U.S. Provisional Patent Application No. 62/370,143, filed on Aug. 2, 2016, the contents of which are incorporated herein by reference in their entirety.

FIELD

The present disclosure is directed to a device for lifesaving, more specifically to a fall-arresting device with automatically deployed anchors.

BACKGROUND

Fall protection systems are compulsory for construction workers on projects requiring them to work more than 6 feet off the ground. Employers who fail to provide such systems may be fined by regulatory agencies such as the U.S. Occupational Safety and Health Administration (OSHA). While numerous fall protection systems exist, they can be complicated, expensive, difficult to install, confusing to use, difficult to remove at the end of a job, damaging to the work surface, or unduly limiting to worker movement.

As a result, workers may fail to properly use their fall protection system, if such a system is even provided. This habit is particularly dangerous in the roofing industry. According to the U.S. Bureau of Labor Statistics, falls from roofing projects cause over ten percent of all construction labor fatalities. Workers for small establishments, which are less likely to be able to provide comprehensive fall protection systems, experience a disproportionately high number of fatal falls. Even looking at the industry as a whole, however, workers in the roofing industry are three times more likely to experience fatal work-related injuries than construction workers in any other industry.

There is an unmet need in the art for a portable, easy-to-use system for fall restraint that does not unduly damage a work surface or limit worker movement.

BRIEF SUMMARY

An exemplary embodiment of the present application is a firing block for use in a system for fall restraint. The firing block is made up of an upper block and a lower block. Firing pins and firing springs extend through upper block cylinders in the upper block. The firing pins extend through retaining nuts in upper ends of the upper block cylinders. Firing cartridges and anchors extend through lower block cylinders in the lower block.

Another exemplary embodiment of the present application is a system for fall restraint. The system includes a mounting frame connected to a trigger mechanism and multiple firing blocks, as above, as well as a trigger cable extending through a frame aperture in the mounting frame and a trigger aperture in the trigger mechanism. The trigger mechanism is made up of trigger rods connected to a pivoting trigger by connecting rods. Each of the trigger rods slidably extends between the upper block cylinders and the lower block cylinders of one of the firing blocks. Each of the trigger rods has trigger rod openings corresponding to the upper block cylinders such that when the trigger rod openings are aligned with the upper block cylinders, the firing pins can contact the firing cartridges in the lower block cylinders. The pivoting trigger is rotatably connected to the mounting frame by pivot arms. The trigger cable has a cable stop at a distal end with a diameter larger than a diameter of the trigger aperture.

The objects and advantages will appear more fully from the following detailed description made in conjunction with the accompanying drawings.

BRIEF DESCRIPTION OF THE DRAWINGS

FIG. 2a is a front perspective view of a mounting frame, trigger mechanism, and firing blocks from an exemplary embodiment of the fall restraint system.

FIGS. 2b, 2c, and 2d are back perspective cross-sectional views of a pivoting trigger and trigger safety from an exemplary embodiment of the fall restraint system.

FIGS. 3a and 3b are front perspective and partial front perspective views, respectively, of a firing block from an exemplary embodiment of the fall restraint system.

FIG. 3c is a cross sectional view of a firing barrel from an exemplary embodiment of the fall restraint system.

DETAILED DESCRIPTION

Figure 1A:
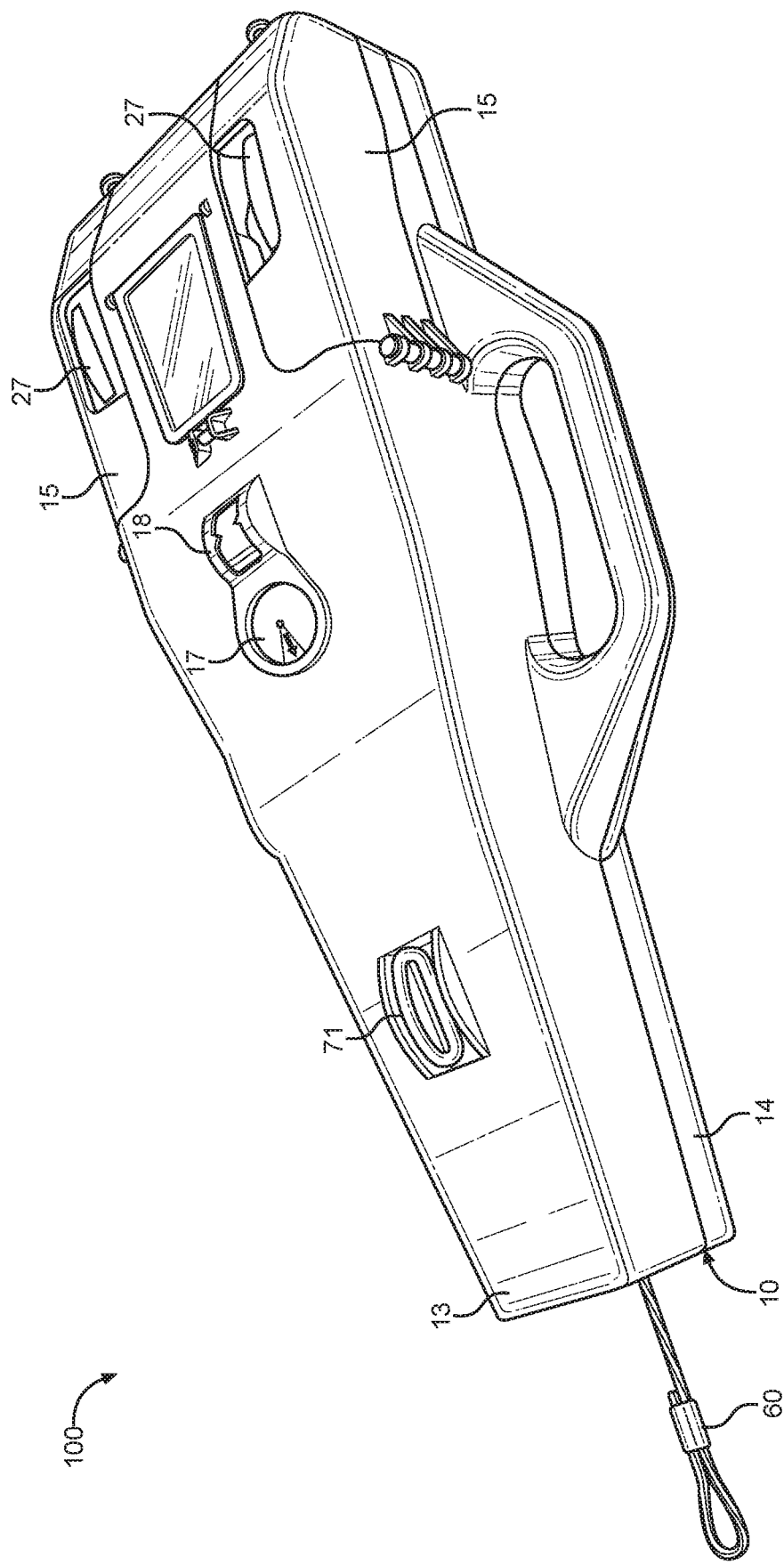
FIGS. 1a, 1b, and 1c are front perspective, rear partially exploded, and rear perspective views, respectively, of an exemplary embodiment of a fall restraint system.
Figure 1B:
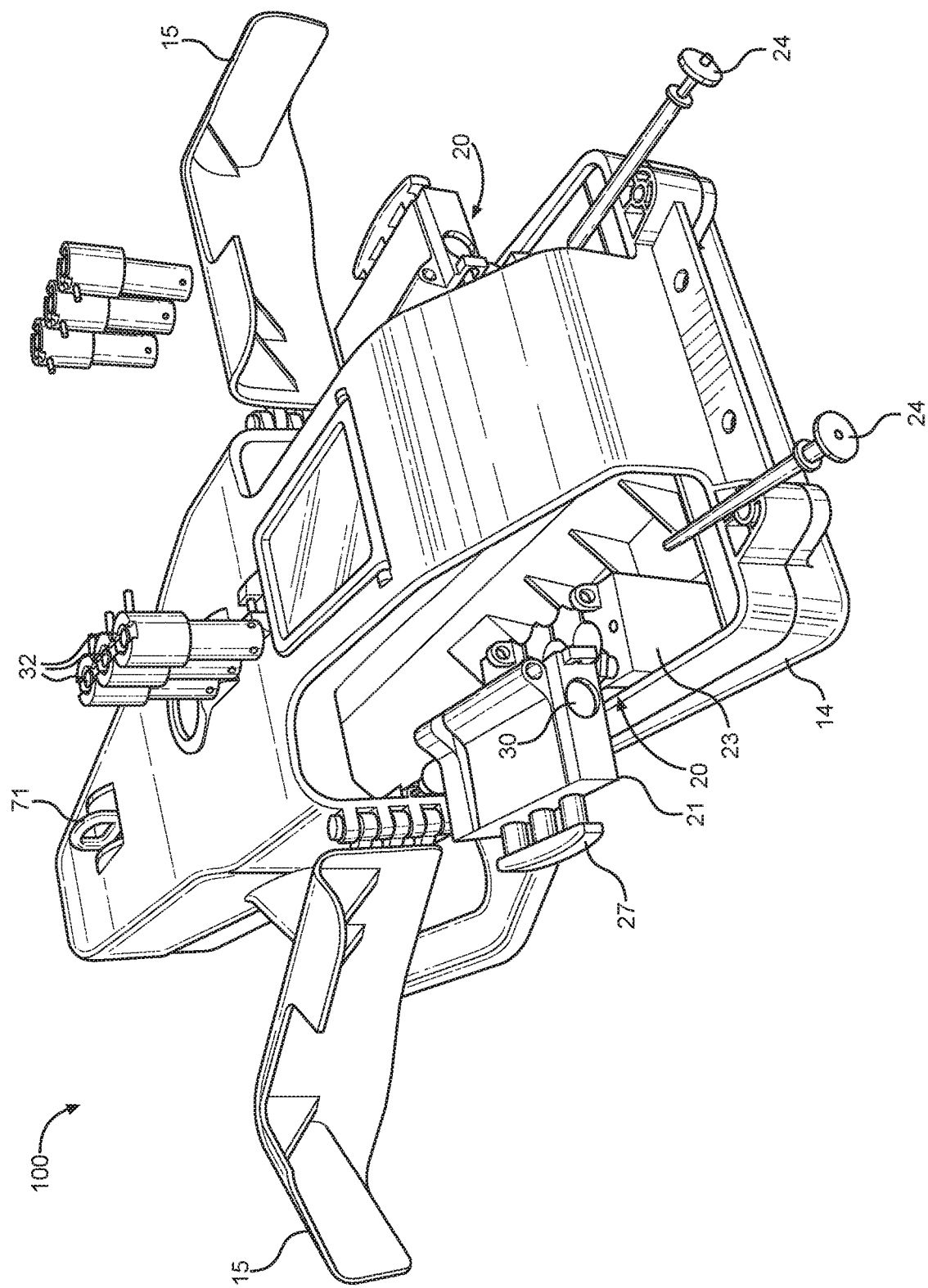
Figure 1C:
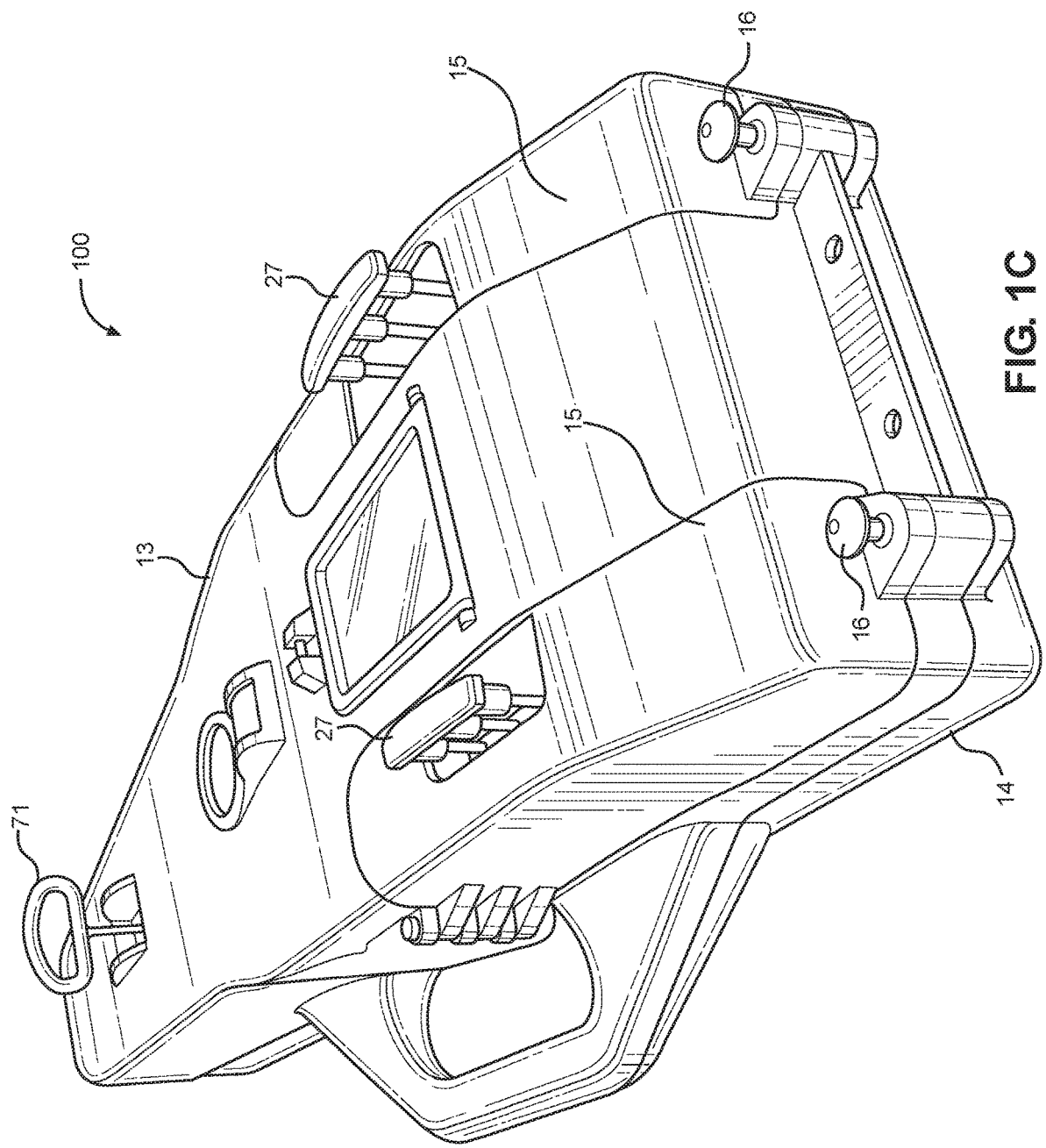
Figure 3E:
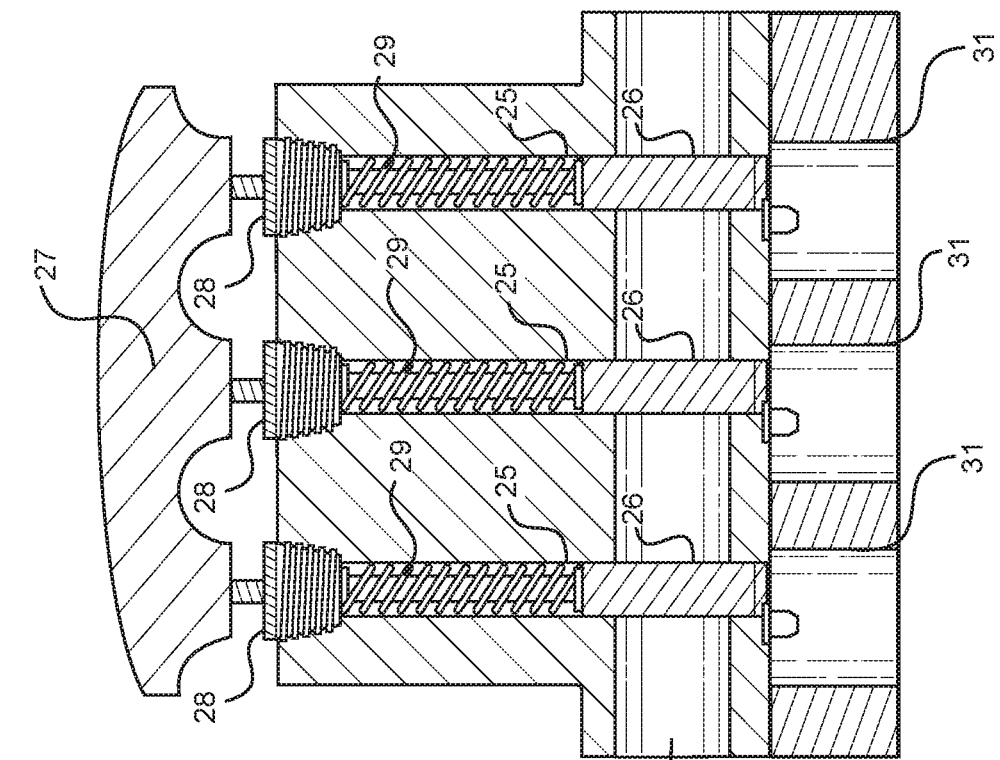
FIGS. 3d and 3e are partial cross sectional views of primed and discharged firing blocks, respectively, from an exemplary embodiment of the fall restraint system.
Figure 3D:
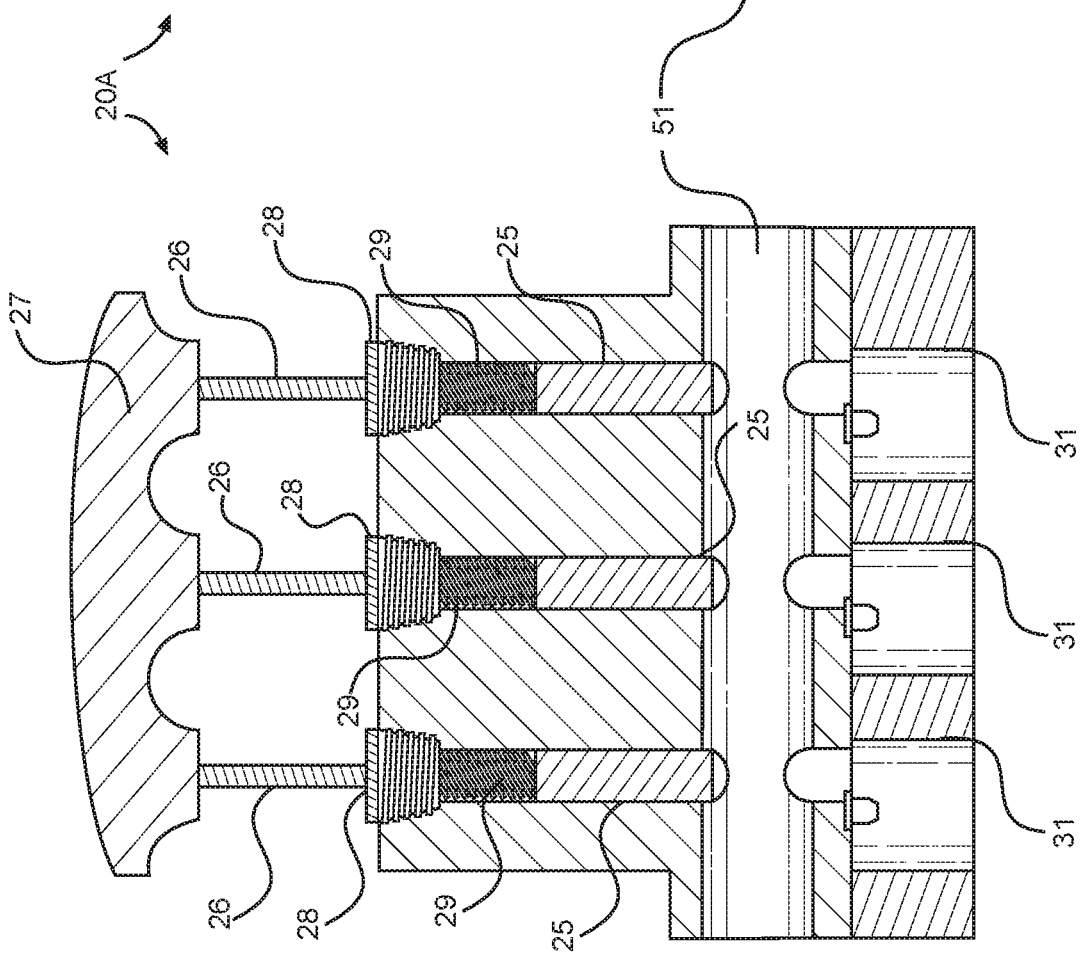
Figure 4:
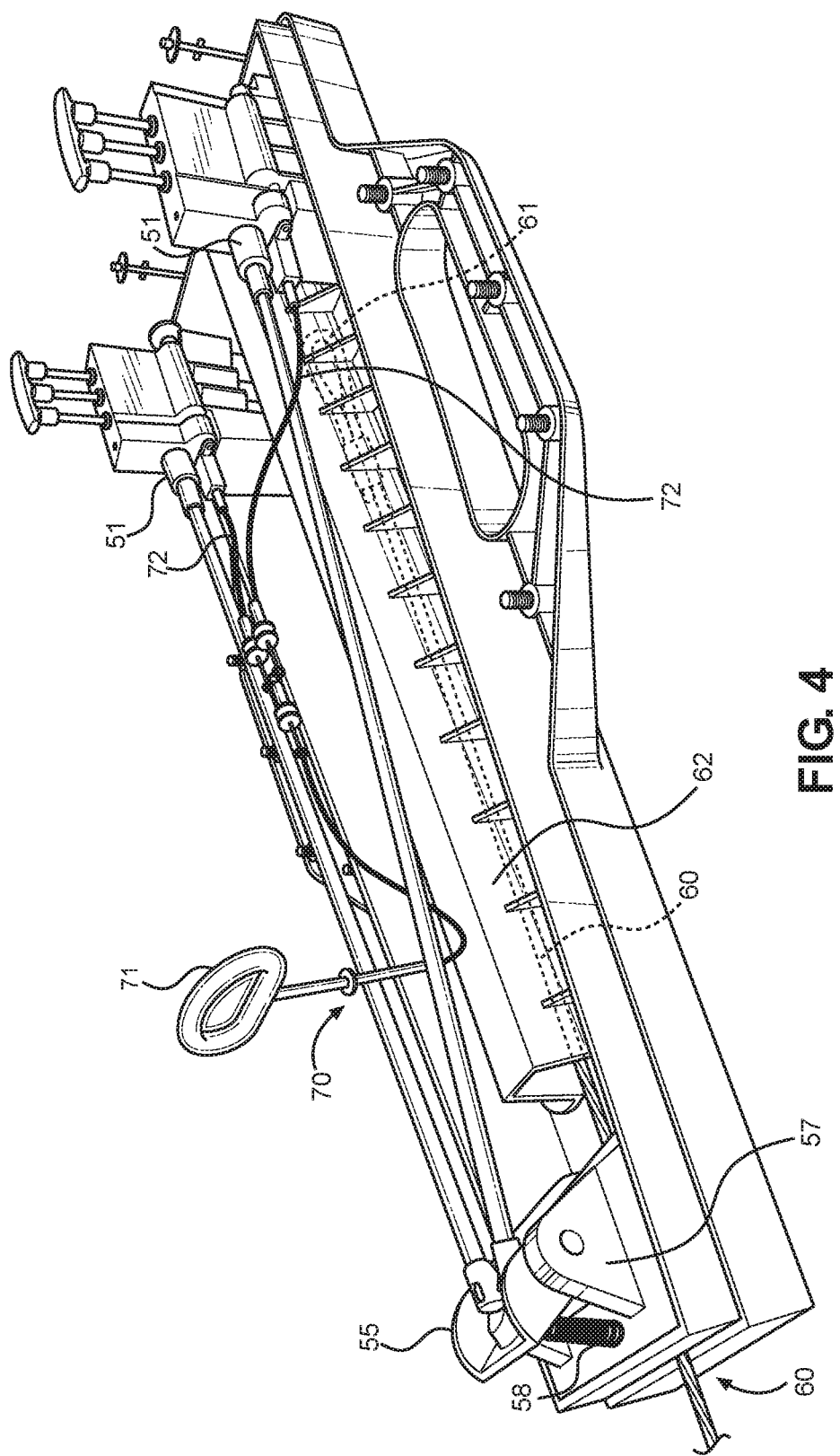
FIG. 4 is a partial front perspective view of an exemplary embodiment of a fall restraint system.

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

In the exemplary embodiment, fall restraint system 100 is a single, contained unit for use by a single worker. Other embodiments may include multiple linked units for use by multiple workers. An external shell 10 encloses two firing blocks 20 loaded with firing cartridges 40 and anchors 45. In the event of a fall, a trigger mechanism 50 connected to firing blocks 20 and attached to a worker's safety harness triggers, firing cartridges 40 and deploying anchors 45. A safety interlock mechanism 70 connected to firing blocks 20 prevents accidental firing and deployment of anchors 45.

External shell 10 includes a substantially triangular mounting frame 11 connected to a lower shell 14 and supporting firing blocks 20. Mounting frame 11 is a rigid metal frame, such as, but not limited to, steel or aluminum. An upper shell 13 is connected to lower shell 14. In the exemplary embodiment, mounting frame 11 is steel, while upper shell 13 and lower shell 14 are a rigid polymer, such as, but not limited to, a fiber-filled nylon polymer. While mounting frame 11 is welded in the exemplary embodiment, other embodiments may be a single piece of metal. In certain embodiments, lower shell 14 has a friction-enhanced lower surface to prevent system 100 from sliding down a roof in wet or otherwise slippery conditions. The lower surface of lower shell 14 may be roughened, have protruding surface features, or be at least partially coated in a polymer, natural rubber, or any other material with a coefficient of friction high enough to prevent sliding on a roof.

After discharge of firing cartridges 40, a user may open reloading doors 15 in upper shell 13 to access adjacent firing blocks 20. Removal of door locks 16 from reloading doors 15 allows the user to pivot open reloading doors 15 to break open firing blocks 20 and replace expended firing cartridges 40 and anchors 45.

In certain embodiments, a horizontal inclinometer 17 and/or a vertical inclinometer 18 are embedded in upper shell 13. As used herein, an inclinometer is any device used to measure and indicate slope. Safe use of system 100 is dependent on system 100 being used on an appropriate slope. Horizontal inclinometer 17 is used to align system 100 with the ridge of the roof. Vertical inclinometer 18 is used to determine if the roof pitch is safe for the deployment of system 100. In the exemplary embodiment, vertical inclinometer 18 uses colored indicia to indicate "safe" pitches of up to 6/12 in green, "possible but not recommended" pitches between 6/12 and 8/12 in yellow, and "unsafe" pitches over 8/12 in red.

Only one firing block 20 will be described below, as each firing block 20 is an identical mirror image of the other. Firing block 20 includes an upper block 21 connected by a hinge connection 22 to a lower block 23. In the exemplary embodiment, upper block 21 and lower block 23 are printed aluminum. In other embodiments, upper block 21 and lower block 23 may be cast or machined aluminum. Removal of a block lock 24 allows firing block 20 to "break," or rotate upper block 21 laterally away from a center axis of system 100 on hinge connection 22. Upper block 21 includes a plurality of upper block cylinders 25 extending vertically therethrough. In the exemplary embodiment, firing block 20 has three upper block cylinders 25; other embodiments may include more or fewer upper block cylinders 25.

A firing pin 26 extends through each upper block cylinder 25. Firing pins 26 are connected at their upper ends by a priming handle 27 such that raising or lowering priming handle 27 simultaneously raises or lowers, respectively, all firing pins 26. Priming handle 27 also serves to visually indicate that firing block 20 is ready to fire. Each firing pin 26 extends through a retaining nut 28 located at the upper end of upper block cylinder 25. As the user raises priming handle 27, retaining nut 28 compresses a firing spring 29 connected to firing pin 26. In the exemplary embodiment, firing spring 29 is coiled around the circumference of firing pin 26. When released, the force exerted by firing spring 29 causes the lower end of firing pin 26 to strike an upper end of firing cartridge 40 with sufficient force to set off firing cartridge 40.

Lower block 23 is mounted directly to mounting frame 11. A plurality of lower block cylinders 31 corresponding to upper block cylinders 25 extend vertically through lower block 23. Lower block cylinders 31 are offset from upper block cylinders 25 (i.e., the central longitudinal axes of lower block cylinders 31 are parallel to the central longitudinal axes of upper block cylinders 25) to ensure that all discharge from firing cartridge 40 is exerted on propelling anchor 45 downward, and not on propelling the casing of firing cartridge 40 upward. This configuration also allows the use of firing cartridges 40 with a rimfire configuration, as rimfire cartridges require an offset firing pin 26. In the exemplary embodiment, each lower block cylinder 31 holds a removable firing barrel 32 for ease of reloading. Each firing barrel 32 contains one firing cartridge 40 loaded above one anchor 45. To reload firing blocks 20, the user may remove firing barrels 32, remove expended firing cartridges 40 and anchors 45, reload firing barrels 32 with anchors 45 and firing cartridges 40, and replace the now-loaded firing barrels 32 into their respective lower block cylinders 31.

In certain embodiments, firing cartridges 40 are gun powder cartridges. In the exemplary embodiment, firing cartridges 40 are .25 caliber rimfire cartridges; other embodiments may use firing cartridges 40 with a different caliber or centerfire configuration. In the exemplary embodiment, anchors 45 are nails. In other embodiments, anchors 45 are pins or any other projectile capable of penetrating a roof surface.

Trigger mechanism 50 ensures that firing cartridges 40 discharge only when the user is sliding or falling. Trigger rods 51 extend through trigger rod channels 30 in firing blocks 20. Each trigger rod 51 has a plurality of trigger rod apertures 52 corresponding to upper block cylinders 25 and lower block cylinders 31. When trigger mechanism 50 is in a resting configuration, trigger rod apertures 52 are offset from upper block cylinders 25, preventing firing pins 26 from striking and discharging firing cartridges 40. When trigger mechanism 50 is in a deployed configuration, trigger rod apertures 52 are aligned with upper block cylinders 25, allowing firing pins 26 to pass through trigger rod apertures 52 and strike and discharge firing cartridges 40. In the exemplary embodiment, a spring-loaded safety plunger 33 in each firing block 20 prevents movement of trigger rod 51 when upper block 21 is separated from lower block 23, as when firing block 20 is broken open for reloading. When upper block 21 rotates from lower block 23, spring bias pushes safety plunger 33 down to engage corresponding surfaces on trigger rod 51, preventing movement of trigger rod 51.

Connecting rods 53 interconnect trigger rods 51 and pivoting trigger 55. In the exemplary embodiment, connecting rods 53 are connected to trigger rods 51 and pivoting trigger 55 by ball joints 54 at either end of each connecting rod 53. Ball joints 54 are ball-and-socket joints that permit firing blocks 20 to break open without any parts coming out of alignment. Pivoting trigger 55 rotates about pivot arms 57, which are mounted to mounting frame 11. In the exemplary embodiment, pivot arms 57 combine and extend from a single block; in other embodiments, pivot arms 57 are separately connected to mounting frame 11. In the exemplary embodiment, pivot arms 57 are aluminum. Pivoting trigger 55 is a mechanical advantage trigger, requiring decreased force to move connecting rods 53. In the exemplary embodiment, the advantage is 3:1, though other advantages may be used for more or less sensitive pivoting trigger 55.

In certain embodiments, a return spring 58 extending between pivoting trigger 55 and mounting frame 11 biases an upper portion of pivoting trigger 55 to a resting distal position. Certain embodiments also include a rotating trigger safety 59 mounted to the proximal end of upper shell 13. A first position of rotating trigger safety 59 blocks movement of pivoting trigger 55 to prevent accidental triggering, while a second position allows movement of pivoting trigger 55.

A trigger cable 60 extends through a frame aperture 12 and a trigger aperture 56. Trigger cable 60 has no constraints on proximal or distal movement aside from a cable stop 61 at a distal end. As a result, a cable shroud 62 connected to lower shell 14 covers trigger cable 60 to prevent trigger cable 60 or cable stop 61 from tangling with or catching on other parts of system 100. In the exemplary embodiment, cable shroud 62 is a polymer, such as, but not limited to, an acrylonitrile butadiene styrene polymer.

Cable stop 61 has a diameter larger than that of trigger aperture 56. Consequently, when trigger cable 60 passes through frame aperture 12 and trigger aperture 56 beyond a certain point, cable stop 61 catches on pivoting trigger 55 and causes rotating movement of pivoting trigger 55 about pivot arms 57. This movement of pivoting trigger 55 about pivot arms 57 moves connecting rods 53 proximally. Proximal movement of connecting rods 53 in turn aligns trigger rod apertures 52 with upper block cylinders 25, allowing discharge of firing cartridges 40, deployment of anchors 45, and immoveable anchoring of system 100.

Safety interlock mechanism 70 ensures that system 100 does not discharge firing cartridges 40 until safety interlock mechanism 70 is disengaged. Safety lock handle 71 is used to actuate safety interlock mechanism 70. Safety lock handle 71 is a twist-to-lock pull handle, i.e. it must be pulled up from upper shell 13 and rotated to actuate safety interlock mechanism 70. This reduces the likelihood of accidental actuation of safety interlock mechanism 70. Safety lock handle 71 connects to safety plates 72 via safety cables 75. Each safety plate 72 is located within a firing block 20 below trigger rod channel 30, and is slidably connected to upper block 21 via safety plate retainers 73. To prevent safety cables 75 from becoming entangled in system 100, safety cables 75 extend through safety cable sheaths 76 connected to upper blocks 21 by safety cable brackets 77.

When system 100 is in a "safe" configuration, firing pin apertures 74 in safety plate 72 are offset from upper block cylinders 25, preventing firing pins 26 from striking and discharging firing cartridges 40. When system 100 is in an "active" configuration, firing pin apertures 74 are aligned with upper block cylinders 25, allowing firing pins 26 to pass through firing pin apertures 74 and strike and discharge firing cartridges 40. The user may pull safety lock handle 71 and rotate it in a first circular direction to slide safety plates 72 proximally for active configuration.

Because safety cables 75 are non-compressible within safety cable sheaths 76, the user can also rotate safety lock handle 71 in a second, opposite circular direction and push it to slide safety plates 72 distally for safe configuration. Once system 100 is primed, the user may "dry fire" system 100 by placing system 100 in safe configuration and actuating pivoting trigger 55. This will release compression on firing springs 29, allowing storage of system 100 without the risk of accidental discharge.

To load system 100, the user must first open reloading doors 15 and break open both firing blocks 20. Trigger mechanism 50 should be in its deployed configuration and safety interlock mechanism 70 in its safe configuration. The user then removes firing barrels 32 from lower block cylinders 31, loads each firing barrel 32 with an anchor 45 and a firing cartridge 40, replaces firing barrels 32 in lower block cylinders 31, closes firing blocks 20, and closes reloading doors 15.

To prime system 100, the user must pull both priming handles 27 up until the trigger rods 51 can be moved proximally and offset from upper block cylinders 25 such that trigger mechanism 50 is in a resting configuration. Safety interlock mechanism 70 should still be in its safe configuration. To place system 100 in active configuration, the user must pull safety lock handle 71 up from upper shell 13 and rotate it 90 degrees. Once primed and active, system 100 is ready to deploy anchors 45 in an emergency.

Typically, the user will connect their safety harness to the proximal end of trigger cable 60 by rope, cable, or some other line of a sufficient length to allow free movement without setting off system 100. The line must, however, be sufficiently short to set off system 100 before the user falls far enough for injury, if a fall occurs. If the user does fall from a roof when connected to a primed and active system 100, then the line attached to trigger cable 60 will pull trigger cable 60 out of external shell 10 until cable stop 61 hits pivoting trigger 55. The force exerted by cable stop 61 on pivoting trigger 55 will cause pivoting trigger 55 to rotate about pivot arms 57, moving connecting rods 53 distally. Connecting rods 53 will move trigger rods 51 distally, allowing trigger rod apertures 52 to align with upper block cylinders 25. Firing pins 26 may then descend to strike and discharge firing cartridges 40. The force of expanding gasses from firing cartridges 40 will propel anchors 45 into the roof surface to anchor system 100, arresting the user's fall.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A system for fall restraint, comprising:
a mounting frame;
a trigger mechanism having a trigger movably mounted to the mounting frame, wherein the trigger mechanism is operably coupled to a plurality of firing pins, and wherein the trigger mechanism is operably coupleable to a user; and
a plurality of anchors extendable from the mounting frame upon actuation of the trigger mechanism.

2. The system of claim 1, wherein the trigger rotates relative to the mounting frame.

3. The system of claim 1, wherein the trigger rotates about pivot arms mounted to the mounting frame.

4. The system of claim 1, wherein the trigger mechanism is operably coupleable to a user by a trigger cable.

5. The system of claim 4, wherein the trigger cable extends through a trigger aperture in the trigger mechanism.

6. The system of claim 5, wherein the trigger cable comprises a cable stop having a diameter larger than a diameter of the trigger aperture.

7. The system of claim 1, wherein the plurality of anchors are actuated by gunpowder.

8. The system of claim 7, wherein the gunpowder is contained within a plurality of removable firing cartridges.

9. The system of claim 8, wherein each firing cartridge is contained within one of a plurality of removable firing barrels.

10. The system of claim 8, wherein each of the plurality of firing pins is offset from one of the plurality of firing cartridges.

11. The system of claim 8, wherein the plurality of firing cartridges comprise .22 caliber rimfire cartridges or .25 caliber rimfire cartridges.

12. The system of claim 8, wherein the plurality of firing cartridges comprise .22 caliber centerfire cartridges or .25 caliber centerfire cartridges.

13. The system of claim 1, wherein each of the plurality of anchors is contained within one of a plurality of removable firing barrels.

14. The system of claim 13, wherein each of the plurality of firing pins is coupled to an upper portion of one of the plurality of removable firing barrels.

15. The system of claim 1, wherein one of a plurality of removable firing barrels extends between the mounting frame and each of the plurality of firing pins.

16. The system of claim 15, wherein one of a plurality of firing cartridges extends between each of the plurality of firing pins and each of the plurality of anchors.

17. The system of claim 1, wherein the plurality of anchors comprise a plurality of nails.

18. The system of claim 1, wherein the plurality of anchors extend through the mounting frame upon actuation of the trigger mechanism.

19. The system of claim 1, further comprising a shell surrounding the mounting frame and the trigger mechanism.

20. The system of claim 19, further comprising a trigger safety connected to the shell, wherein the trigger safety must be actuated to enable actuation of the trigger mechanism.

\* \* \* \* \*